US012164282B2

United States Patent
Stump et al.

(10) Patent No.: US 12,164,282 B2
(45) Date of Patent: *Dec. 10, 2024

(54) INTELLIGENT BINDING AND SELECTION OF HARDWARE VIA AUTOMATION CONTROL OBJECTS

(71) Applicant: Rockwell Automation Technologies, Inc., Mayfield Heights, OH (US)

(72) Inventors: Andrew R. Stump, Mentor, OH (US); Srdjan Josipovic, Montreal (CA); Matthew R. Ericsson, Lyndhurst, OH (US); Michael D. Kalan, Highland Heights, OH (US); Anthony Carrara, Strongsville, OH (US); Christopher W. Como, Chagrin Falls, OH (US); Sharon M. Billi-Duran, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,657

(22) Filed: Jun. 29, 2023

(65) Prior Publication Data

US 2023/0341839 A1    Oct. 26, 2023

Related U.S. Application Data

(63) Continuation of application No. 17/734,507, filed on May 2, 2022, now Pat. No. 11,726,457, which is a
(Continued)

(51) Int. Cl.
*G05B 19/418* (2006.01)
*G05B 19/04* (2006.01)
*G05B 19/05* (2006.01)

(52) U.S. Cl.
CPC ......... *G05B 19/418* (2013.01); *G05B 19/041* (2013.01); *G05B 19/05* (2013.01); *G05B 2219/13052* (2013.01)

(58) Field of Classification Search
CPC .... G05B 19/418; G05B 19/041; G05B 19/05; G05B 2219/13052; G05B 2219/13172; G05B 19/056
See application file for complete search history.

(56) References Cited

U.S. PATENT DOCUMENTS 5,949,674 A * 9/1999 Song ................ G05B 19/41835
700/8
6,874,148 B1   3/2005 Richardson et al.
(Continued)

FOREIGN PATENT DOCUMENTS

EP      1284446 A1    2/2003
EP      2595510 A1    5/2013

OTHER PUBLICATIONS

Borland: "Borland C++ User's Guide", Borland C++ User's Guide, Oct. 31, 1993, pp. 1-462, XP055627917, USA, http://www.bitsavers.org/pdf/borland/borland_C++_Version_4.0_Users_Guide_Oct93.pdf.
(Continued)

*Primary Examiner* — Chad G Erdman

(57) ABSTRACT

The present disclosure is directed to systems, methods and devices for facilitating object-based industrial automation control. An automation control library comprised of a plurality of objects may be maintained in association with one or more industrial automation applications. Code defining the execution of an industrial automation process may be received. A plurality of objects in the object library for implementing the industrial automation control process may be identified. The plurality of identified objects may be matched to one or more hardware components based on one
(Continued)

or more operational requirements included in the code, and available hardware resources for performing the automation control process.

20 Claims, 7 Drawing Sheets

Related U.S. Application Data continuation of application No. 17/007,630, filed on Aug. 31, 2020, now Pat. No. 11,320,806, which is a continuation of application No. 16/143,978, filed on Sep. 27, 2018, now Pat. No. 10,761,514.

(56) References Cited

U.S. PATENT DOCUMENTS

| | | |
|---|---|---|
| 6,931,288 B1 | 8/2005 | Lee et al. |
| 7,324,856 B1 | 1/2008 | Bromley |
| 7,809,683 B2 | 10/2010 | Hood et al. |
| 9,128,479 B2 | 9/2015 | Reichard et al. |
| 2004/0075689 A1 | 4/2004 | Schleiss et al. |
| 2005/0027376 A1 | 2/2005 | Lucas et al. |
| 2005/0027377 A1 | 2/2005 | Lucas et al. |
| 2005/0222698 A1 | 10/2005 | Eryurek et al. |
| 2006/0195817 A1 | 8/2006 | Moon |
| 2006/0259500 A1 | 11/2006 | Hood et al. |
| 2006/0277027 A1 | 12/2006 | Mann et al. |
| 2006/0277498 A1 | 12/2006 | Mann et al. |
| 2007/0132779 A1 | 6/2007 | Gilbert et al. |
| 2008/0127092 A1 | 5/2008 | Tomar |
| 2010/0083232 A1 | 4/2010 | Chouinard |
| 2012/0029661 A1 | 2/2012 | Jones et al. |
| 2013/0123948 A1 | 5/2013 | Reid et al. |
| 2014/0129550 A1 | 5/2014 | Weatherhead et al. |
| 2014/0129822 A1 | 5/2014 | Weatherhead et al. |
| 2015/0363543 A1 | 12/2015 | Mansouri et al. |
| 2016/0109875 A1 | 4/2016 | Majewski et al. |
| 2018/0017952 A1* | 1/2018 | Jundt .................. G05B 15/02 |
| 2018/0113430 A1 | 4/2018 | Naidoo et al. |

OTHER PUBLICATIONS

European Search Report, Ref. EO124781-AN for European Appl. No. 19199778.2-1224 dated Feb. 20, 2020, Munich, DE, mail Mar. 27, 2020, 10 pages.

European Search Report: "EP124776_EESR", Feb. 20, 2020, pp. 1-14, Munich, Germany.

Final Office Action for U.S. Appl. No. 16/144,105 dated Jun. 15, 2020, 64 pages.

Notice of Allowance and Fees Due for U.S. Appl. No. 16/144,073, mailed Apr. 1, 2021.

Notice of Allowance and Fees Due for U.S. Appl. No. 16/144,105, mailed May 18, 2021.

Eilermann et al., "A general approach to module-based plant design," Elsevier, 2018, 16pg. (Year 2018).

* cited by examiner

INTELLIGENT BINDING AND SELECTION OF HARDWARE VIA AUTOMATION CONTROL OBJECTS

RELATED APPLICATIONS

This application is a continuation of, and claims the benefit of and priority to, U.S. patent application Ser. No. 17/734,507, filed May 2, 2022, and entitled "Intelligent Binding and Selection of Hardware Via Automation Control Objects," which is a continuation of U.S. Pat. No. 11,320, 806, filed Aug. 31, 2020, issued May 3, 2022, and entitled "Intelligent Binding and Selection of Hardware via Automation Control Objects," which is a continuation of U.S. Pat. No. 10,761,514, filed Sep. 27, 2018, issued on Sep. 1, 2020, and entitled "Intelligent Binding and Selection of Hardware via Automation Control Objects," each of which are hereby incorporated by reference in their entirety for all purposes.

BACKGROUND

Controller logic and visualization code for automated processes is typically written with the specifications of the hardware utilized in the processes being known. For example, when writing controller logic, a developer typically starts with the knowledge of what type of controller or controllers will be used to control the associated process, what the specifications are for the I/O points in those controllers, and what hardware components are going to be controlled by those controllers. The developer then specifically writes the controller logic and/or visualization code for the corresponding processes based on those specifications. However, when modifications are made to the automation system (e.g., new controllers, valves, pumps, scan rate requirements), the developer then typically must go back and re-write large chunks of code for the process to accommodate the system modifications. Additionally, when new controllers are introduced to the automation system, to take advantage of those resources, the developer also has to re-write large portions of code.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential feature of the claimed subject matter, nor is it intended to be used as an aid in determining the scope of the claimed subject matter.

Non-limiting examples of the present disclosure describe systems, methods, and devices for facilitating object-based industrial automation control. Controller code and/or visualization code for an industrial automation process may be written without the exact specifications of the hardware that will implement the process being known. In some examples, placeholders may be utilized for the unknown hardware components, and those placeholders may later be replaced with specific software automation objects once the specifications for the hardware resources are known. In some examples, once the software automation objects have been introduced into controller code, one or more controllers may be selected for executing that code based on requirements of the objects (e.g., execution rate), the number of operations to be executed by the controllers, and/or the specifications of the controllers (e.g., scan rate). In additional examples, controller code may be spread across one or more available controllers in order to balance the processing load for executing an automated process.

DETAILED DESCRIPTION

Figure 1:
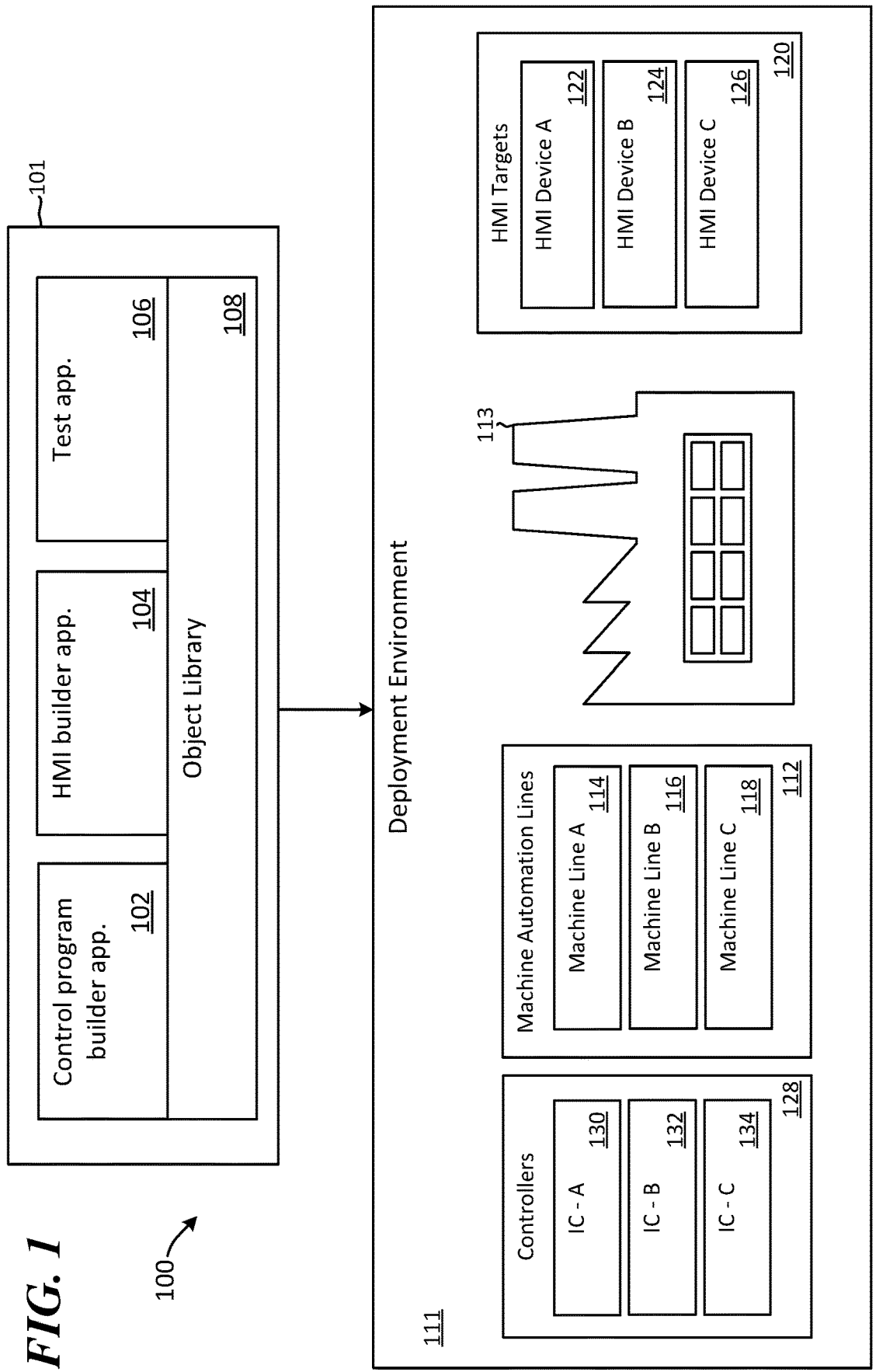
FIG. 1 is a schematic diagram of an exemplary distributed computing environment for facilitating object-based industrial automation control.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally, the present disclosure is directed to systems, methods and devices for late binding of automation objects to controller logic and/or industrial automation visualization code (e.g., HMI code) and load balancing amongst industrial controller resources. According to examples, controller logic and/or visualization code may be created that includes basic operations and hardware components that are necessary for executing and/or visually displaying a desired automated process. This code (the base code) may include generic placeholders for one or more automation objects (e.g., pump objects, valve objects, tank objects, etc.). Once the base code is created, a user can select automation objects corresponding to the user's available hardware resources. For example, a user may select a plurality of specific automation objects corresponding to the user's hardware resources, those automation objects may replace the generic placeholders in the controller code, and the controller code may be deployed in one or more industrial controllers. In some examples, an industrial automation application may select which of a plurality of industrial controllers to execute the code with and/or which I/O ports to utilize for portions of controller logic that is being deployed. In selecting which controllers to execute the code with and/or which I/O ports to utilize, the execution rate of the bound objects may be taken into account in association with the scan rate of available controller resources.

Technical advantages are achieved according to aspects described herein. For example, processing costs (i.e., CPU cycles) associated with writing new controller and/or automation visualization code when new hardware is introduced into an automation system are reduced. That is, industrial automation code has typically been written specifically for hardware that a user knows will be utilized in the execution of a particular automated process. For example, a user typically knows what controller or controllers will be utilized to control which specific hardware resources in a particular automated process, and code will be specifically written for those pieces. However, aspects of the current disclosure provide mechanisms for late binding of objects, such that users can reuse the same base code for controller logic and/or visualization code, switch out the hardware at will, and simply introduce different automation objects into the base code corresponding to the different hardware, thereby significantly reducing the amount of code that needs to be re-written and/or stored in association with these modifications.

FIG. 1 is a schematic diagram of an exemplary distributed computing environment 100 for facilitating user communication for industrial automation system design. Computing environment 100 includes automated industrial process software build sub-environment 101, machine automation lines sub-environment 112, HMI targets sub-environment 120, and controllers sub-environment 128. Any and all of the computing devices with regard to the various distributed computing environments described herein may communicate with one another via one or more wired or wireless networks. In some examples, controller sub-environment 128, machine automation lines sub-environment 112, and/or HMI targets sub-environment 120, may be deployed together in an industrial automation process factory setting, such as in factory 113 in deployment environment 111.

Automated industrial process software build sub-environment 101 includes control program builder application 102, HMI builder application 104, and test application 106, although other industrial automation applications are contemplated. Automated industrial process software build sub-environment 101 also includes object library 108, which comprises a plurality of automated software objects that one or more of the applications in industrial process software build sub-environment 101 may share and/or access. In some examples, object library 108 may be stored locally on one or more computing devices associated with any of control program builder application 102, HMI builder application 104 and/or test application 106. In other examples, object library 108 may be located remotely (e.g., in cloud storage), and one or more computing devices executing control program builder application 102, HMI builder application 104, and/or test application 106, may access object library 108 via a wired or wireless network.

Control program builder application 102 comprises an application for building industrial automation software modules (e.g., single automation control device files, multiple automation control device files) for execution by one or more industrial controllers (e.g., industrial controller-A 130, industrial controller-B 132, industrial controller-C 134) in the performance of routines of an automated industrial process. In some examples, the industrial automation software modules that may be built using control program builder application 102 may comprise ladder logic, function block diagram, sequential function chart, structured text, instruction list, C, and C++, among other software forms.

A ladder logic software module may comprise one or more ladder logic statements, referred to as rungs or instructions. The ladder logic statements define relationships between an output variable and one or more input variables. Input variables are variables that correspond to signals at input terminals and output variables are variables that correspond to signals at output terminals. In relay ladder logic, the input and output signals may be represented graphically as contact symbols and coil symbols arranged in a series of rungs spanning a pair of vertical power rails. A typical ladder logic statement may indicate that a specific output variable is "on" if and only if a first and second input is "on". The ladder logic software module, executed by one or more industrial controllers, manipulates single-bit input and output data representing the state of sensing and operating devices, such as devices machine automation lines sub-environment 112 (e.g., machine line A 114, machine line B 116, machine line C 118) in a factory setting. The ladder logic software module, executed by the one or more industrial controllers, also performs arithmetic operations, timing and counting functions and more complex processing operations. As noted above, however; a controller logic may be created in other software languages, and at its core, the logic functions by taking in inputs from field devices, performing calculations and operations on those inputs, and writing outputs for controlling the field devices based on the calculations.

HMI builder application 104 is an application for building industrial automation software modules (e.g., single HMI configuration files, multiple HMI configuration files) for execution on HMI devices in HMI targets sub-environment 120, which may include typical HMI devices such as dedicated HMI panels, as well as deployment of automation visualization interfaces on computing devices such as smart phones and tablets. An HMI typically receives, via one or more controllers, and processes the status data from devices performing various routines in an industrial automation process (e.g., devices in machine automation lines sub-environment 112, which are deployed in factory 113). An HMI processes, utilizing one or more industrial automation software modules built in HMI builder application sub-environment 104, the status data to generate various graphical displays, which may indicate the current and historical performance of the machines. For example, an HMI graphical display might indicate status metrics of a drive, the pressure of a pump, the speed of a motor, or the output of a robot, each of which may be performing operations that are part of a routine executed in machine automation lines sub-environment 112, controlled from one or more industrial controllers in controllers sub-environment 128.

Test application 106 may perform one or more operations associated with loading industrial automation software modules into virtualized industrial controllers and running one or more industrial automation routines encoded as instructions in the software modules on the virtualized industrial controllers. Test application 106 may utilize the properties of various objects from object library 108 employed in the execution of one or more routines to determine whether new industrial automation software controller modules created in control program builder application 102 perform as desired. Test application 106 may also utilize the properties of various objects from object library 108 employed in the execution of one or more routines to determine whether new industrial automation software HMI modules created in HMI builder application 104 perform as desired. If bugs or unintended issues arise in the testing of one or more routines, test application 106 may identify an object and or software module associated with the problem and flag it for review.

The industrial controllers in controllers sub-environment 128 (industrial controller-A 130, industrial controller-B 132, and industrial controller-C 134) are special purpose computers used for controlling factory devices performing one or more routines in machine automation lines sub-environment 112. Under the direction of one or more industrial automation software modules (e.g., industrial automation software modules built by control program builder application 102), a processor of an industrial controller examines a series of inputs reflecting the status of a controller process or device and changes outputs affecting control of the controlled process or device. The industrial controllers in controllers sub-environment 128 may be constructed in modular fashion to accommodate different application types requiring different numbers and types of input/output (I/O) circuits as is determined by the particular device or process being controlled.

Industrial automation software modules may be delivered to the industrial controllers in source format, token format, object code or executable code. These modules can bind to and use hardware, firmware and/or operating system resources of the industrial controllers. Loadable libraries may be provided to the industrial controllers during runtime to extend functionality and/or provide desired fixes. The stored industrial automation software modules run in real-time or near real-time to provide outputs to the control processes as electrical signals to outputs such as actuators and the like. The outputs are based on the logic of an industrial automation software module and inputs received from sensors of a controlled process being performed in machine automation lines sub-environment 112 in a factory such as in factory 113. One or more industrial controllers may be involved in the performance of routines in machine automation lines sub-environment 112, and the industrial controllers involved in those routines may communicate with the various devices performing those routines via local connections, such as by ethernet, or over a wireless network.

One or more of the industrial controllers in controllers sub-environment 128 may comprise programmable logic controllers (PLCs), which execute a series of operations that are performed sequentially and repeatedly. In general, the series of operations includes an input scan, a program/module scan and an output scan. During the input scan the PLC examines the on or off state of the external inputs and saves these states temporarily in memory. During the program/module scan the PLC scans the instruction of the program/module and uses the input status to determine if an output will be energized. The output results are then saved to memory. During the output scan the controller will energize or de-energize the outputs based on the output results stored in memory to control the external devices.

The computing devices in computing environment 100 utilize object-oriented programming techniques. Additionally, the various sub-environments in computing environment 100 may utilize shared object programming techniques whereby objects in object library 108, and the objects' properties, are shared amongst software modules (e.g., HMI software modules in HMI targets sub-environment 120, controller software modules in controllers sub-environment 128). Object oriented programming shifts the emphasis of software development away from function decomposition and towards the recognition of units of software called "objects" which encapsulate both data and functions. Object oriented programming objects are software entities comprising data structures and operations on data. Together, these elements enable objects to model virtually any real-world entity in terms of its characteristics, represented by its data elements, and its behaviors represented by its data manipulation functions. In this way, objects can model concrete things like physical components of automated industrial processes (e.g., pumps, belts, filters, tanks, computers), and they can model abstract concepts like numbers or geometrical concepts (e.g., flow rate values, tank volumes, connection types).

Each object in object library 108 may comprise a set of data (e.g., attributes) and a set of operations (e.g., methods), that can operate on the data. Each object in object library 108 may additionally or alternatively comprise a set of renderings that can display a set of data, self-describing documentation, one or more graphs that trace object data, and/or a set of configurations that provide alarms related to the data. Methods in an object are invoked by passing a message to the object. The message specifies a method name and an argument list. When the object receives the message, code associated with the named method is executed with the formal parameters of the method bound to the corresponding values in the argument list. Methods and message passing in object oriented programming are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object in object library 108 represents a class of some control element. A class includes a set of data attributes plus a set of allowable operations (e.g., methods) on the data attributes. Object oriented programming supports inheritance-a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization. One or more objects in object library 108 may comprise complex objects built from multiple instances of similar objects. Systems, methods and devices described herein may employ abstract object classes, which are designs of sets of objects that collaborate to carry out a set of responsibilities. Frameworks are essentially groups of interconnected objects and classes that provide a prefabricated structure for a working application. Additional description related to the objects and their implementation in the current invention is provided in relation to FIG. 2.

Figure 2:
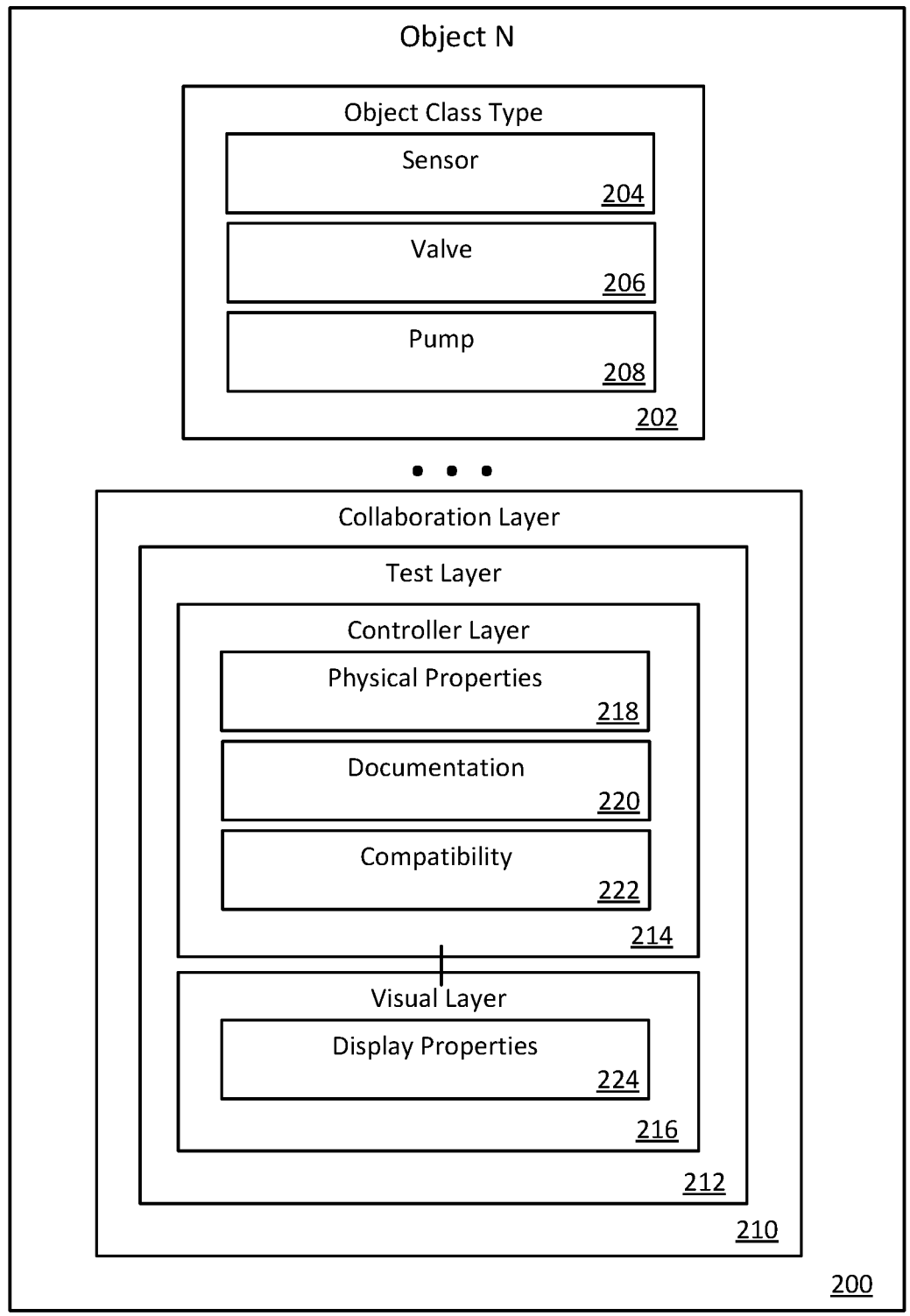
FIG. 2 is a simplified block diagram of an exemplary automation software object and its various components, which may be utilized in the control and visualization of industrial automation processes.

FIG. 2 is a simplified block diagram of an exemplary automation software object 200 and its various components, which may be utilized in the control and visualization of industrial automation processes and routines. Object 200 is an automation software object that may be included as part of a software object library, such as object library 108. In some examples, object 200 may be incorporated in controller software modules for execution by one or more industrial controllers for controlling operations associated with automated industrial processes and routines, and/or virtualized industrial controllers for virtually controlling operations associated with automated industrial processes and routines. In additional examples, object 200 may be incorporated in HMI software modules for execution by one or more HMIs for generating various graphical displays, which may indicate the current and historical performance of the machines associated with automated industrial processes and routines. In additional examples, object 200 may be incorporated in both HMI software modules and controller software modules.

Object 200 comprises a class type 202. While various class types are possible for assignment to object 200, for exemplary purposes, object 200 is indicated as having one of a sensor class type 204, a valve class type 206, or a pump class type 208 assigned to it. The class types depicted in the object class type 202 element each correspond to a common hardware type in industrial automation processes, and they are provided for exemplary purposes; however, users may also create their own class types, which may correspond to combinations of product types and/or product skids (e.g., combinations of devices for performing various automation routines). Additionally, although broad class types are shown for ease of example, each class type may have sub-class types as well (e.g., specific types of sensors, valves, pumps, controllers, displays, etc.), for which more exact specifications may be associated with object 200.

Object 200 also includes collaboration layer 210, test layer 212, controller layer 214, and visual layer 216. Controller layer 214 comprises a plurality of properties and property types, including physical properties 218, documentation properties 220, and compatibility property type 222. In some examples, controller layer 214 may also comprise controller code and/or properties.

Documentation properties 220 may include information about the specific object type specified in object class type 202. For example, if object 200 is a specific brand and type of valve, documentation properties 220 may specify the name of the manufacturer of the valve, actions that may be performed by the valve, operating pressures that the valve can withstand, operating temperatures that the valve can withstand, flow rate, etc. If object 200 is a specific brand and type of temperature sensor, documentation properties 220 may specify the name of the manufacturer of the sensor, temperature range of the sensor, accuracy range of the sensor, scan frequency of the sensor, etc. If object 200 is a specific brand and type of pump, documentation properties 220 may specify the name of the manufacturer of the pump, maximum discharge flow for the pump, maximum discharge pressure for the pump, operating temperatures that the pump can withstand, horsepower for the pump, etc.

Compatibility properties 222 may also include information about the specific object type specified in object class type 202. For example, if object 200 is a specific brand and type of valve, compatibility properties 222 may specify types of service the valve is intended to handle (e.g., air, gas, liquid, vacuum), connection types, etc. If object 200 is a specific brand and type of temperature sensor, compatibility properties 222 may specify types of environments it is intended to handle (e.g., air, gas, liquid, vacuum), connection types, etc. If object 200 is a specific brand and type of pump, compatibility properties 222 may specify types of service the pump is intended to handle (e.g., types of fluid), connection types, etc.

Physical properties 218 include the physical specifications (e.g., size, geometry, mass, material etc.) of object 200.

Visual layer 216 includes display properties, which in association with one or more physical properties 218, documentation properties 220, and/or compatibility properties 222, may be utilized to accurately generate display components in real-time corresponding to components operating in an industrial automation routine. For example, display properties 224 may include various color properties for types of liquid and gas in an industrial automation routine, and when data from pumps, sensors and tanks from the routine are processed by the HMI and/or an industrial controller, those physical properties may be translated with the appropriate color types for the liquid and/or gas involved in the routine for graphically displaying the current state of the routine.

Controller layer 214 comprises a plurality of industrial controller-oriented operations/methods that may be performed by an industrial controller utilizing one or more properties of object 200, such as physical properties 218, documentation properties 220, compatibility properties 222, and/or display properties 224 (in association with visual layer 216). The operations performed by the industrial controller utilizing instructions associated with controller layer 214 direct hardware components of industrial automation processes to perform actions associated with ladder logic routines via various I/O communications as more fully described above.

Test layer 212 comprises a plurality of industrial controller-oriented operations/methods that may be performed by a virtual industrial controller utilizing one or more properties of object 200. The test layer may be associated with the performance of test script operations on object 200 that a typical industrial controller would be expected to perform, while flagging failed operations or operations that lead to unexpected results. Test layer 212 may also include a plurality of HMI-oriented operations/methods that may be performed by an HMI or virtualized HMI utilizing one or more properties of object 200, including display properties 224, physical properties 218, documentation properties 220, and/or compatibility properties 222.

Collaboration layer 210 comprises a plurality of operations/methods that may be performed on one or more properties of object 200. The collaboration operations/methods permit multi-user access to a control project, including centralized control, message coding from one user to another, collaborative development of industrial automation projects, such as collaborative development of application code for an industrial controller or design of an industrial automation process system. According to some examples, operations associated with collaboration layer 210 may provide mechanisms for users to leave notes for one another in association with objects and/or industrial automation projects that objects are included in. In additional examples, the operations associated with collaboration layer 210 may provide mechanisms for users to flag issues associated with development of industrial automation projects. In some examples, the operations associated with collaboration layer 210 may provide for cross-domain collaboration (e.g., a first user may leave a note related to an object while working with the object in HMI code and the note may be surfaced to a second user in relation to the same object in controller code that the second user is working on). In other examples, the operations associated with collaboration layer 210 may provide for same-domain collaboration (e.g., a first user may leave a note related to an object in a first area and/or routine of controller code and the note may be surfaced to a second user in relation to the same object in a second area and/or routine of controller code that the second user is working on).

Figure 3:
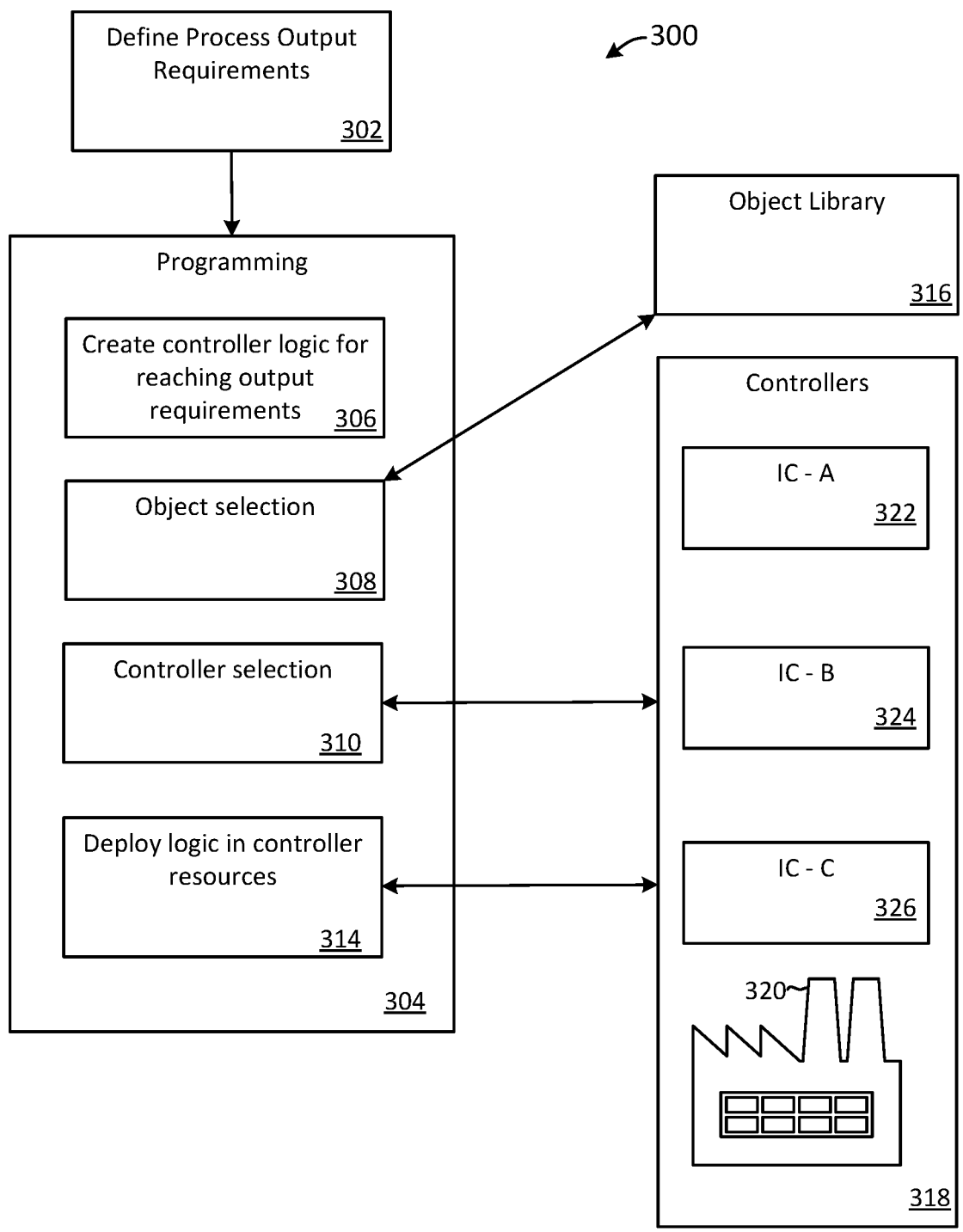
FIG. 3 illustrates an exemplary distributed computing environment for binding controller logic to automation objects and hardware.

FIG. 3 illustrates an exemplary distributed computing environment 300 for binding controller logic to automation objects and hardware. Computing environment 300 includes process planning sub-environment 302, programming sub-environment 304, object library 316, and process deployment sub-environment 318. At least one computing device may be associated with each sub-environment in computing environment 300, and those computing devices may communicate with one another via wired and/or wireless networks as described herein.

Process planning sub-environment 302 comprises an environment where one or more users identify output production requirements for an industrial automation process. The output production requirements may include finalized products and/or components of finalized products that will be combined into finalized products, as well as a desired number and/or quantity of output products that are to be produced by the process. In some examples, the output production requirements may also include a number and/or quantity of output product that are to be produced over a specified duration of time (e.g., ten-thousand units in one hour, one-hundred gallons in one hour).

Programming sub-environment 304 comprises an environment, and included operations, where one or more users create controller logic on one or more computing devices for implementing an industrial automation process for producing the products identified in process planning sub-environment 302, and where the created controller logic is matched and deployed to automation objects and hardware components for implementing the industrial automation process.

Programming sub-environment 304 includes controller logic creation operations 306, where controller logic for producing the output requirements identified in process planning sub-environment 302 is created. The controller logic may comprise specific functions that are to be performed by the industrial automation hardware, as well as specific requirements of hardware that the code will be implemented with (e.g., analog input vs. discrete input). The controller logic may also leave one or more fields open to selection at a later time when the controller logic will be bound to specific automation objects and hardware. For example, the controller logic may specify a frequency and/or conditions for energizing one or more hardware components that are needed to produce output requirements identified in process planning sub-environment 302, while leaving one or more fields open until binding, such as a number of controllers for executing an automated process, a scan rate that one or more controllers are going to use during execution of an automated process, and/or a number of I/O points on controllers that are going to be bound to the controller logic.

Programming sub-environment 304 also includes object selection operations 308, where automation objects are selected and bound to the controller logic that was created at operation 306. As illustrated, the automation objects may be selected and/or identified from an object library, such as object library 316. Although the controller logic may generically specify the hardware components that are to execute an automation process, specific automation objects may be selected at operation 308 for executing an automation process based on currently available hardware resources and/or hardware resources that a user ultimately expects to implement an automation process with. For example, if controller logic generically specifies that pumps having "range Y" capabilities (e.g., pumps with at least Y horsepower), and valves having "range X" capabilities (e.g., valves capable of handling at least X temperature and/or X pressure), are to be utilized in executing an automation process, any pump objects having "range Y" capabilities, and any valve objects having "range X" capabilities, may be bound to the controller logic. As such, it is easy for users to swap out and/or switch hardware components, without needing to perform a complete software overall to account for such modifications.

Programming sub-environment 304 further includes controller selection operations 310, where one or more industrial controllers are selected for executing operations associated with the controller logic. In some examples, a user may specify a number of controllers that are to execute the controller logic and/or one or more specific types of controllers that are to execute the controller logic. For example, while the controller logic may specify that any controller with a scan rate of X milliseconds and Y number of analog input points may be utilized in controlling a routine corresponding to the controller logic, a user may select specific one or more controllers for executing that logic at operations 310. Like with object selection operations 308, this provides a high degree of flexibility in that it allows users to easily switch controllers while leaving the base control logic the same.

According to some examples, controller selection operations 310 may include manual or automatic selection of one or more controllers for execution of controller logic. In some examples, a user may specify that one or more specific types of controllers with explicitly identified specifications are available for use in an automated process, and one or more of those controllers may be selected for executing controller logic based on the parameters in the controller logic and/or properties of automation objects that were selected during object selection operations 308. For example, objects that have been selected for use in execution of controller logic may contain properties that specify minimum and/or ideal criteria that controllers should have for interfacing with those objects. Similarly, the controller logic itself may have certain specifications that controllers must have for its execution (e.g., I/O types, scan rate requirements, etc.). In additional examples, a selection component of an industrial automation application in programming sub-environment 304 may communicate with one or more available controllers (e.g., industrial controllers A 322, industrial controller B 324, and industrial controller C 326, in process deployment sub-environment 318) and automatically determine/identify their specifications, which can be used by the industrial automation application to select one or more of those controllers for executing the controller logic.

In some examples, the industrial automation application may select one or more controllers for executing controller logic based on load balancing criteria in addition to requirements associated with object properties or controller logic. For example, if a plurality of controllers are available for executing controller logic, operations from the controller logic may be split for execution on multiple controllers to optimize execution of those operations and reduce processing load on individual controllers. As an example, controller logic be split amongst controllers to load balance by separating skid module logic amongst a plurality of controllers (e.g., logic corresponding to a first skid may be executed by a first controller, logic corresponding to a second skid may be executed by a second controller).

Programming sub-environment includes logic deployment operations 314, where controller logic is deployed to one or more controllers in process deployment sub-environment 318 for execution in a factory environment, such as factory 320, based on performed controller selection operations 310. That is, once controller logic has been created, automation objects have been selected for applying that logic to, and controllers have been selected to execute the logic, one or more files corresponding to the controller logic may be sent, via one or more wired or wireless networks, for execution on one or more selected controllers in process deployment sub-environment 318.

Figure 4:
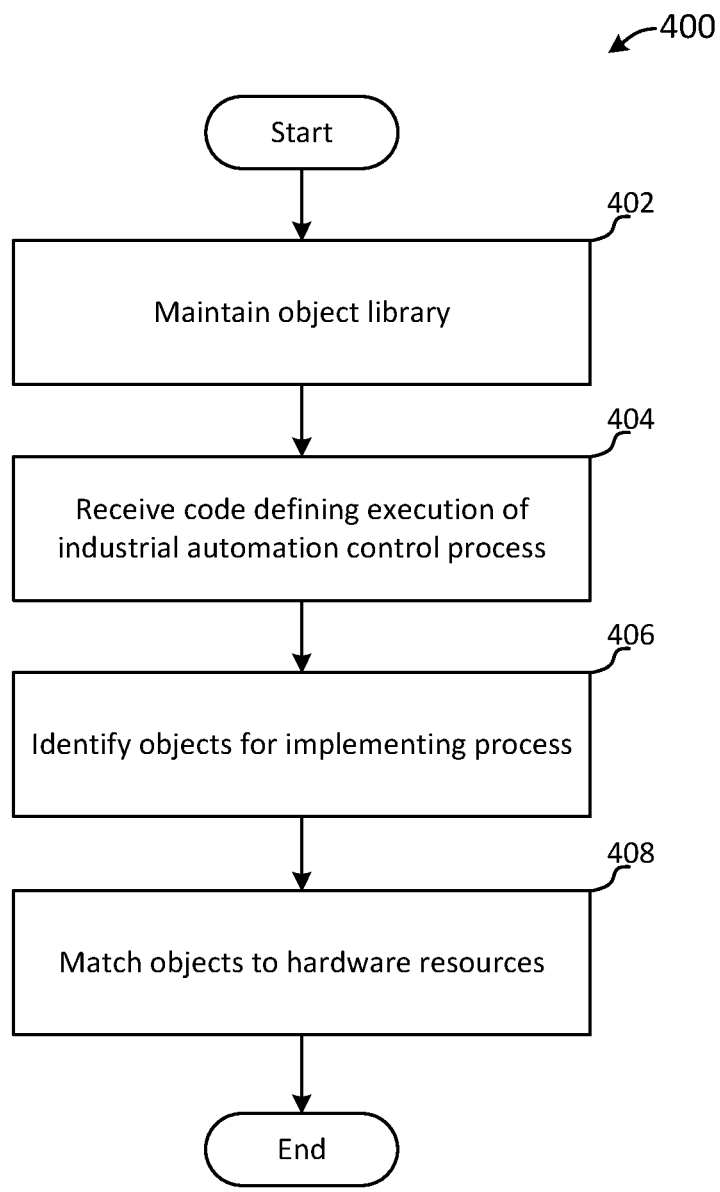
FIG. 4 illustrates an exemplary method for late binding of automation objects to controller logic and selecting industrial controller resources for executing controller logic.

FIG. 4 illustrates an exemplary method 400 for late binding of automation objects to controller logic and selecting industrial controller resources for executing controller logic. The method 400 begins at a start operation and flow moves to operation 402.

At operation 402 a software automation object is maintained. The object library may be maintained in association with one or more industrial automation applications (e.g., an industrial control application, an automation visualization application, a test application). In some examples, the object library may comprise a cloud-based library that is accessed by one or more industrial automation applications via a network. In other examples, the object library may be stored all or in part on client computing devices on which the industrial automation applications are running. Each object in the object library may have a use type associated with it for use in an industrial automation process. The use type may comprise a class type, such as a valve type object, a pump type object, a tank class object, a belt class object, etc. In some examples, each object in the object library may have a binding layer for binding the object to one or more hardware components of an industrial automation process.

From operation 402 flow continues to operation 404 where code defining execution of an industrial automation control process is received. The code may comprise controller logic of one or more types, including an instruction list type, a structured text type, a ladder diagram type, and/or a sequential function chart type. The code may define the execution of the industrial automation process in that it includes instructions for the execution of one or more operations by the hardware components of the industrial automation process, which will be under the control of one or more industrial controllers. However, the code may be received in a form that leaves the specific object types that are to be utilized in the automation process generic, such that a user can select objects for fulfilling those roles, as well as switch them out, after this base code has been created. The base code that is received at operation 402 may include placeholders where objects that are eventually selected for executing the process are to be inserted and/or generic object types may be initially provided in those portions of code.

From operation 404 flow continues to operation 406 where a plurality of objects for implementing the industrial automation control process are identified from the object library. In some examples, a user may identify and select pre-created objects that have been loaded into the object library that correspond to the user's current hardware for implementing the automated process, and those selected objects may be bound to the base code. In other examples, a user may create new objects corresponding to the user's hardware, insert those objects into the object library, and select those objects for binding to the base code. In other examples, an industrial automation application associated with the base code may identify objects from the object library that are capable of performing the operations in the base code, and if there is more than one such object for a given operation or set of operations, the industrial automation application may allow a user to select from amongst those objects for binding to the base code.

From operation 406 flow continues to operation 408 where the plurality of objects are matched to one or more industrial controllers for execution of the base code that has been bound to the objects. In some examples, an object that has been bound to base code may dictate which industrial controllers, and/or which I/O resources on an industrial controller, the operations associated with that object in the base code are to be deployed to. For example, if a bound object comprises a pressure or temperature sensor object, that object may have to be bound to an analog input. In other examples, the execution rate of an object may dictate a minimum scan rate that a controller must have in order to properly control operations associated with that object. In some examples, an industrial automation application associated with the code may automatically identify controller requirements associated with the bound objects and the code that those objects are bound to, identify appropriate controller resources for executing the code, and deploy the code for execution on the controllers. In other examples, an industrial automation application associated with the code may identify controller requirements associated with the bound objects and the code that those objects are bound to, identify one or more controller resources that may be utilized in executing that code, and allow a user to select amongst those controller resources for executing the code.

From operation 408 flow continues to an end operation and the method 400 ends.

Figure 5:
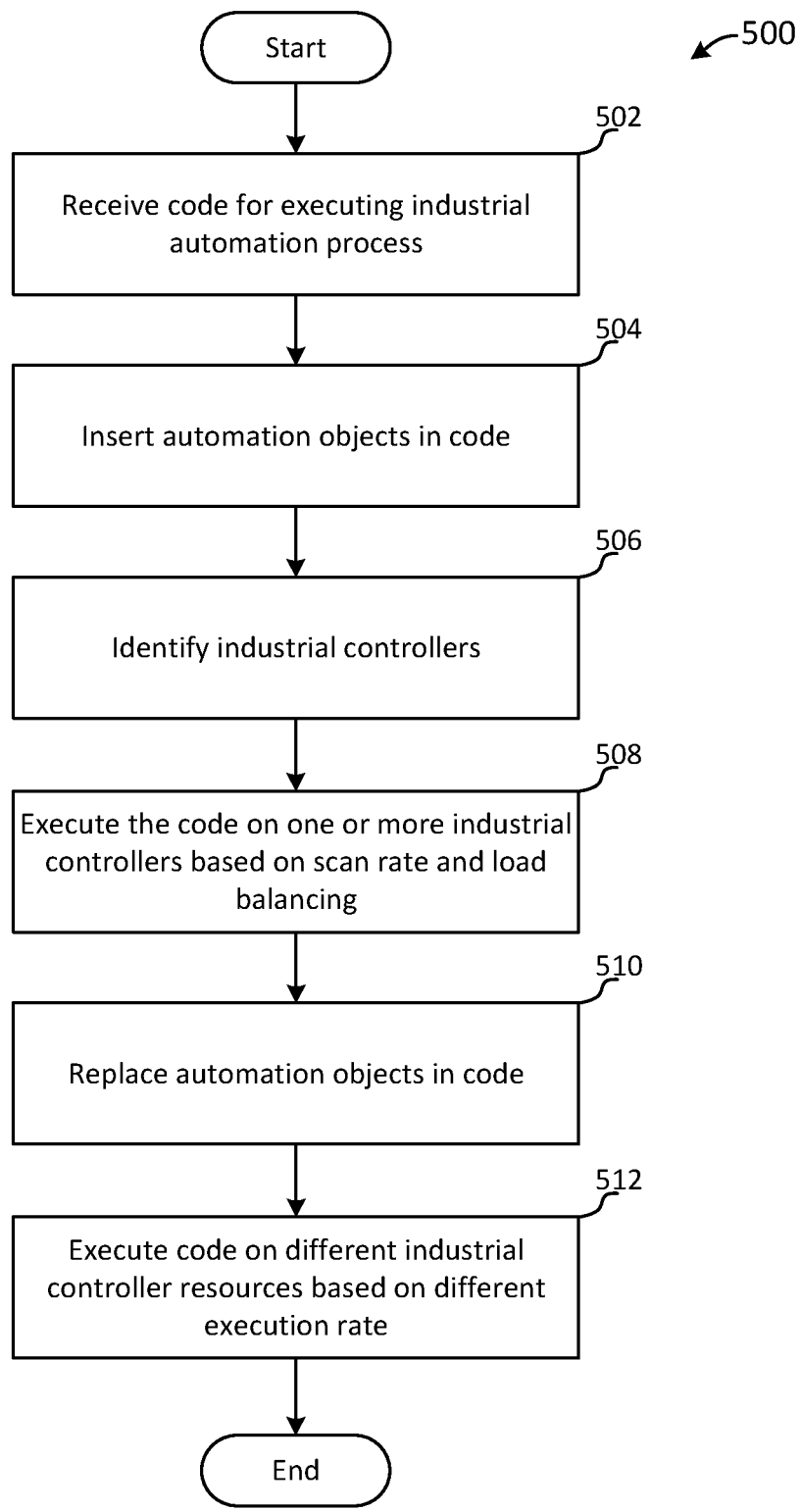
FIG. 5 illustrates an exemplary method for facilitating object-based industrial automation control and code allocation to controllers based on load balancing and execution rate.

FIG. 5 illustrates an exemplary method 500 for facilitating object-based industrial automation control and code allocation to controllers based on load balancing and execution rate. The method begins at a start operation and flow continues to operation 502.

At operation 502 code for executing an industrial automation process is received. The code may be received in the form of one or more programming languages for programming logic controllers. According to examples, the code may comprise base code that has not been bound to all required objects for performing an automated process. In some examples, the base code may include one or more placeholders and/or generic objects, which can be replaced with specific automation objects at a later time.

From operation 502 flow continues to operation 504 where a plurality of automation objects are inserted into the code. The objects may be user-selected to conform to the hardware resources available to the user. For example, if a user has X hardware resources available for implementing an automated process, the user may select automated objects corresponding to those hardware resources, and bind those automated objects to the base code for execution. In other examples, an industrial automation application may receive self-describing data from hardware components that are to be utilized in an automated process, and based on that data, the industrial automation application may automatically select and insert automation objects corresponding to those hardware components into the code. In some examples, at least one of the plurality of automation objects may have a minimum scan rate associated with it. For example, one of the objects may have a requirement that a controller have a scan rate of X milliseconds in order to appropriately function in an automated process.

From operation 504 flow continues to operation 506 where a plurality of industrial controllers for implementing the industrial automation process are identified. The plurality of industrial controller may be identified by an industrial controller application associated with the controller code when a user inputs the name or other specifications related to available industrial controllers that are available for executing an industrial automation process. In other examples, the industrial automation application may receive self-describing data from a plurality of industrial controllers and identify whether they are available for executing an industrial automation process and/or the specific code that is going to be executed.

From operation 506 flow continues to operation 508 where the code is executed on one or more of the industrial controllers based on a scan rate and load balancing criteria. For example, if a plurality of industrial controllers have been identified, but only one or a subset of those controllers meet the minimum scan rate requirement of one or more objects that have been bound to the code, the code may only be executed on the controllers that meet the scan rate requirements. In some examples, one or more industrial controllers that meet the scan rate requirement of one or more objects may execute the code that has been bound to those one or more objects, and one or more other controllers may execute code that does not have those minimum scan rate requirements. In still other examples, the processing of operations in the code may be distributed amongst a plurality of controllers to balance the processing load for the automated process.

From operation 508 flow continues to operation 510 where at least one of the automation objects inserted in the code is replaced with a new automation object with a different minimum scan rate associated with it. For example, a user may replace hardware components in their automation process (e.g., sensors, valves, pumps, etc.) that have a first minimum controller scan rate associated with them, with hardware that has a second, different, minimum controller scan rate associated with them. In such a case, the original automation objects corresponding to the original hardware, which were initially bound to the base code, may be replaced with new automation objects corresponding to hardware having a new minimum scan rate.

From operation 510 flow continues to operation 512 where the code is executed on one or more different industrial controllers based on the different minimum execution rate associated with the new object.

From operation 512 flow continues to an end operation and the method 500 ends.

Figure 6:
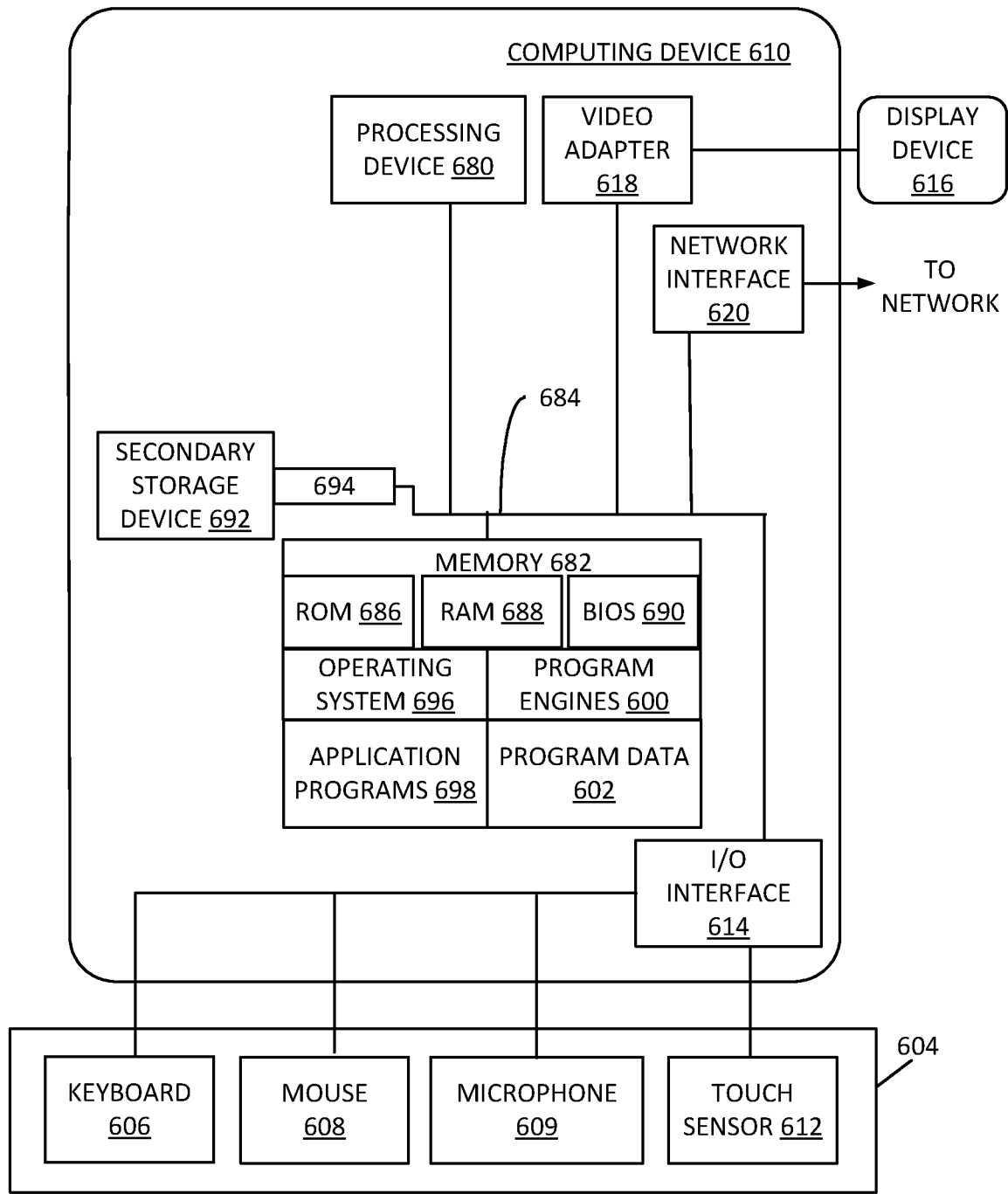
FIG. 6 is a block diagram illustrating example physical components (e.g., hardware) of a computing device with which aspects of the disclosure may be practiced.

FIG. 6 illustrates one aspect in which an exemplary architecture of a computing device according to the disclosure that can be used to implement aspects of the present disclosure, including any of the plurality of computing devices described herein with reference to the various figures and their corresponding descriptions. The computing device illustrated in FIG. 6 can be used to execute the operating system, application programs, and software modules (including the software engines) described herein, for example, with respect to FIG. 7 and program engines 714, joint rendering engine 716, module splitting engine 718, test engine 720, collaboration engine 722, and location determination engine 724. By way of example, the computing device will be described below as the industrial automation computing device 610. To avoid undue repetition, this description of the computing device will not be separately repeated for each of the other computing devices described herein, but such devices can also be configured as illustrated and described with reference to FIG. 6.

The computing device 610 includes, in some embodiments, at least one processing device 680, such as a central processing unit (CPU). A variety of processing devices are available from a variety of manufacturers, for example, Intel, Advanced Micro Devices, and/or ARM microprocessors. In this example, the computing device 610 also includes a system memory 682, and a system bus 684 that couples various system components including the system memory 682 to the processing device 680. The system bus 684 is one of any number of types of bus structures including a memory bus, or memory controller; a peripheral bus; and a local bus using any of a variety of bus architectures.

Examples of computing devices suitable for the computing device 610 include a server computer, a programmable logic controller computer, a desktop computer, a laptop computer, a tablet computer, a mobile computing device (such as a smart phone, an iPod® or iPad® mobile digital device, or other mobile devices), or other devices configured to process digital instructions.

The system memory 682 includes read only memory 686 and random access memory 688. A basic input/output system 690 containing the basic routines that act to transfer information within computing device 610, such as during start up, is typically stored in the read only memory 686.

The computing device 610 also includes a secondary storage device 692 in some embodiments, such as a hard disk drive, for storing digital data. The secondary storage device 692 is connected to the system bus 684 by a secondary storage interface 694. The secondary storage devices 692 and their associated computer readable media provide nonvolatile storage of computer readable instructions (including application programs and program engines), data structures, and other data for the computing device 610. Details regarding the secondary storage devices 692 and their associated computer readable media, as well as their associated nonvolatile storage of computer readable instructions (including application programs and program engines) will be more fully described below with reference to FIG. 7.

Although the exemplary environment described herein employs a hard disk drive as a secondary storage device, other types of computer readable storage media are used in other aspects according to the disclosure. Examples of these other types of computer readable storage media include magnetic cassettes, flash memory cards, digital video disks, Bernoulli cartridges, compact disc read only memories, digital versatile disk read only memories, random access memories, or read only memories. Additional aspects may include non-transitory media. Additionally, such computer readable storage media can include local storage or cloud-based storage.

A number of program engines can be stored in secondary storage device 692 or memory 682, including an operating system 696, one or more application programs 698, other program engines 600 (such as the software engines described herein), and program data 602. The computing device 610 can utilize any suitable operating system, such as Linux, Microsoft Windows™, Google Chrome™, Apple OS, and any other operating system suitable for a computing device.

According to examples, a user provides inputs to the computing device 610 through one or more input devices 604. Examples of input devices 604 include a keyboard 606, mouse 608, microphone 609, and touch sensor 612 (such as a touchpad or touch sensitive display). Additional examples may include other input devices 604. The input devices are often connected to the processing device 680 through an input/output interface 614 that is coupled to the system bus 684. These input devices 604 can be connected by any number of input/output interfaces, such as a parallel port, serial port, game port, or a universal serial bus. Wireless communication between input devices and the interface 614 is possible as well, and includes infrared, BLUETOOTH® wireless technology, cellular and other radio frequency communication systems in some possible aspects.

In an exemplary aspect, a display device 616, such as a monitor, liquid crystal display device, projector, or touch sensitive display device, is also connected to the system bus 684 via an interface, such as a video adapter 618. In addition to the display device 616, the computing device 610 can include various other peripheral devices (not shown), such as speakers or a printer.

When used in a local area networking environment or a wide area networking environment (such as the Internet), the computing device 610 is typically connected to a network through a network interface 620, such as an Ethernet interface. Other possible embodiments use other communication devices. For example, certain aspects of the computing device 610 may include a modem for communicating across the network.

The computing device 610 typically includes at least some form of computer readable media. Computer readable media includes any available media that can be accessed by the computing device 610. By way of example, computer readable media include computer readable storage media and computer readable communication media.

Computer readable storage media includes volatile and nonvolatile, removable and non-removable media implemented in any device configured to store information such as computer readable instructions, data structures, program engines or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 610. Computer readable storage media does not include computer readable communication media.

Computer readable communication media typically embodies computer readable instructions, data structures, program engines or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

Figure 7:
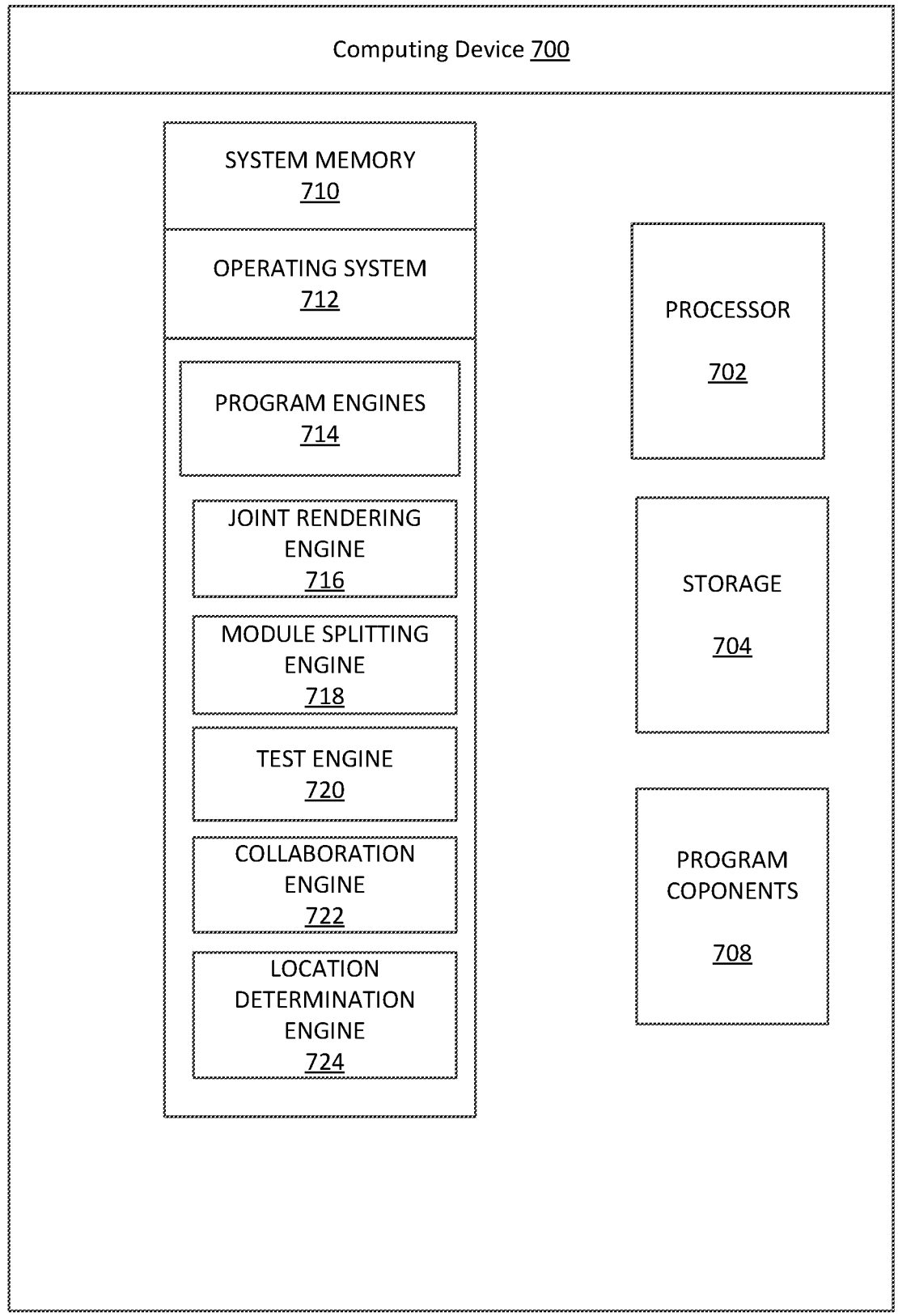
FIG. 7 is a block diagram illustrating physical components (e.g., hardware) of a computing device with which aspects of the disclosure may be practiced.

FIG. 7 is a block diagram illustrating additional physical components (e.g., hardware) of a computing device 700 with which certain aspects of the disclosure may be practiced. The computing device components described below may have computer executable instructions for: receiving code for executing an industrial automation process; inserting a plurality of automation objects into the code, wherein at least one of the automation objects has a minimum scan rate associated with it; identifying a plurality of industrial controllers for implementing the industrial automation process; and executing the code on one or more of the industrial controllers based on a scan rate and a load balancing criteria. The computing device components may additionally or alternatively have computer executable instructions for: maintaining an automation control library comprised of a plurality of objects, wherein each object has a physical counterpart with a use type associated with it for use in an industrial automation process, and wherein each object comprises a binding layer for binding the object to one or more hardware components of an industrial automation process project. Computing device 700 may perform these functions alone or in combination with a distributed computing network and/or one or more additional computing devices which may communicate and process the one or more of the program engines in FIG. 7 including joint rendering engine 716, which may perform one or more operations associated with rendering a plurality of software modules corresponding to hardware components of an automated routine/process as a singular navigable unit; module splitting engine 718, which may perform one or more operations associated with splitting at least one software module off from a collaboratively rendered software module unit; test engine 720, which may perform one or more operations associated with testing ladder logic via one or more virtual industrial controllers; collaboration engine 722, which may perform one or more operations associated with allowing users to communicate and leave notes for one another in the development of industrial automation projects; and location determination engine 724, which may perform one or more operations associated with identifying a location in a software module that has been affected by a modification to a first software module.

In a basic configuration, the computing device 700 may include at least one processor 702 and a system memory 710. Depending on the configuration and type of computing device, the system memory 710 may comprise, but is not limited to, volatile storage (e.g., random access memory), non-volatile storage (e.g., read-only memory), flash memory, or any combination of such memories. The system memory 710 may include an operating system 712 and one or more program engines 714 suitable for facilitating object-based industrial automation control, such as one or more components in regards to FIG. 6 and, in particular, joint rendering engine 716, module splitting engine 718, test engine 720, collaboration engine 722, and location determination engine 724. The operating system 712, for example, may be suitable for controlling the operation of the computing device 700. Furthermore, aspects of the disclosure may be practiced in conjunction with a graphics library, other operating systems, or any other application program and is not limited to any particular application or system.

The computing device 700 may have additional features or functionality. For example, the computing device 700 may also include additional data storage device (removable and/or non-removable) such as, for example, magnetic disks, optical disks, or tape. Such additional storage is illustrated in FIG. 7 by storage 704. It will be well understood by those of skill in the art that storage may also occur via distributed computing networks, which are not shown in FIG. 7.

As stated above, a number of program engines and data files may be stored in the system memory 710. While executing the processor 702, the program engines 714 (e.g., joint rendering engine 716, module splitting engine 718, test engine 720, collaboration engine 722, and location determination engine 724) may perform processes including, but not limited to, the aspects described herein.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A system for facilitating object-based industrial automation control, the system comprising:
one or more processors; and
one or more memories operably coupled to the one or more processors and having stored thereon software instructions that, upon execution by the one or more processors, cause the one or more processors to:
receive code defining instructions for execution of an industrial automation control process;
bind a plurality of objects for implementing the industrial automation control process to the code, wherein each of the plurality of objects corresponds to an aspect of the industrial automation control process;
match a first object of the plurality of objects to a first controller capable of executing a first operation of the code associated with the first object;
match a second object of the plurality of objects to a second controller capable of executing a second operation of the code associated with the second object;
select the first controller and the second controller;
deploy the code to the first controller for execution of the first operation; and
deploy the code to the second controller for execution of the second operation.

2. The system of claim 1, wherein the software instructions comprise further software instructions that, upon execution by the one or more processors, cause the one or more processors to:
identify first controller requirements associated with the first object;
determine that the first controller meets the first controller requirements, wherein the matching the first object to the first controller is based at least in part on the determination that the first controller meets the first controller requirements;
identify second controller requirements associated with the second object; and
determine that the second controller meets the second controller requirements, wherein the matching the second object to the second controller is based at least in part on the determination that the second controller meets the second controller requirements.

3. The system of claim 2, wherein the first controller requirements comprise a minimum scan rate.

4. The system of claim 1, wherein the software instructions comprise further software instructions that, upon execution by the one or more processors, cause the one or more processors to:
receive a first indication from the first controller that the first controller is available for executing the industrial automation control process; and
receive a second indication from the second controller that the second controller is available for executing the industrial automation control process,
wherein the selecting the first controller and the second controller is based at least in part on the first indication, the second indication, and load balancing criteria.

5. The system of claim 1, wherein the software instructions comprise further software instructions that, upon execution by the one or more processors, cause the one or more processors to:
receive self-describing data from the first controller, wherein the matching the first object to the first controller is based at least in part on the self-describing data.

6. The system of claim 1, wherein the software instructions to select the first controller and the second controller comprises further software instructions that, upon execution by the one or more processors, cause the one or more processors to:
receive a user selection of the first controller, the second controller, or both the first controller and the second controller.

7. The system of claim 1, wherein:
the code comprises a plurality of placeholders, and
the software instructions to bind the plurality of objects comprise further software instructions that, upon execution by the one or more processors, cause the one or more processors to:
replace a first placeholder of the plurality of placeholders with the first object; and
replace a second placeholder of the plurality of placeholders with the second object.

8. A non-transitory computer-readable storage media device having program instructions stored thereon to facilitate object-based industrial automation control, wherein the program instructions, upon execution by one or more processors, cause the one or more processors to:
receive code defining instructions for execution of an industrial automation control process;

bind a plurality of objects for implementing the industrial automation control process to the code, wherein each of the plurality of objects corresponds to an aspect of the industrial automation control process;

match a first object of the plurality of objects to a first controller capable of executing a first operation of the code associated with the first object;

match a second object of the plurality of objects to a second controller capable of executing a second operation of the code associated with the second object;

select the first controller and the second controller;

deploy the code to the first controller for execution of the first operation; and deploy the code to the second controller for execution of the second operation.

9. The non-transitory computer-readable storage media device of claim 8, wherein the program instructions comprise further program instructions that, upon execution by the one or more processors, cause the one or more processors to:

identify first controller requirements associated with the first object;

determine that the first controller meets the first controller requirements, wherein the matching the first object to the first controller is based at least in part on the determination that the first controller meets the first controller requirements;

identify second controller requirements associated with the second object; and determine that the second controller meets the second controller requirements, wherein the matching the second object to the second controller is based at least in part on the determination that the second controller meets the second controller requirements.

10. The non-transitory computer-readable storage media device of claim 9, wherein the first controller requirements comprise a minimum scan rate.

11. The non-transitory computer-readable storage media device of claim 8, wherein the program instructions comprise further program instructions that, upon execution by the one or more processors, cause the one or more processors to:

receive a first indication from the first controller that the first controller is available for executing the industrial automation control process; and receive a second indication from the second controller that the second controller is available for executing the industrial automation control process, wherein the selecting the first controller and the second controller is based at least in part on the first indication, the second indication, and load balancing criteria.

12. The non-transitory computer-readable storage media device of claim 8, wherein the program instructions comprise further program instructions that, upon execution by the one or more processors, cause the one or more processors to:

receive self-describing data from the first controller, wherein the matching the first object to the first controller is based at least in part on the self-describing data.

13. The non-transitory computer-readable storage media device of claim 8, wherein the program instructions to select the first controller and the second controller comprise further program instructions that, upon execution by the one or more processors, cause the one or more processors to:

receive a user selection of the first controller, the second controller, or both the first controller and the second controller.

14. The non-transitory computer-readable storage media device of claim 8, wherein:

the code comprises a plurality of placeholders, and the program instructions to bind the plurality of objects comprise further program instructions that, upon execution by the one or more processors, cause the one or more processors to:

replace a first placeholder of the plurality of placeholders with the first object; and replace a second placeholder of the plurality of placeholders with the second object.

15. The non-transitory computer-readable storage media device of claim 8, wherein the program instructions to bind the plurality of objects comprise further program instructions that, upon execution by the one or more processors, cause the one or more processors to:

receive a user selection of the plurality of objects from an object library.

16. A computer-implemented method for facilitating object-based industrial automation control, the computer-implemented method comprising:

receiving code defining instructions for execution of an industrial automation control process;

binding a plurality of objects for implementing the industrial automation control process to the code, wherein each of the plurality of objects corresponds to an aspect of the industrial automation control process;

matching a first object of the plurality of objects to a first controller capable of executing a first operation of the code associated with the first object;

matching a second object of the plurality of objects to a second controller capable of executing a second operation of the code associated with the second object;

selecting the first controller and the second controller;

deploying the code to the first controller for execution of the first operation; and deploying the code to the second controller for execution of the second operation.

17. The computer-implemented method of claim 16, further comprising:

identifying first controller requirements associated with the first object, wherein the first controller requirements comprise a minimum scan rate;

determining that the first controller meets the first controller requirements, wherein the matching the first object to the first controller is based at least in part on the determination that the first controller meets the first controller requirements;

identifying second controller requirements associated with the second object; and determining that the second controller meets the second controller requirements, wherein the matching the second object to the second controller is based at least in part on the determination that the second controller meets the second controller requirements.

18. The method of claim 16, further comprising:

receiving a first indication from the first controller that the first controller is available for executing the industrial automation control process; and receiving a second indication from the second controller that the second controller is available for executing the industrial automation control process, wherein the selecting the first controller and the second controller is based at least in part on the first indication, the second indication, and load balancing criteria.

19. The method of claim 16, further comprising:
receiving self-describing data from the first controller, wherein the matching the first object to the first controller is based at least in part on the self-describing data.

20. The method of claim 16, wherein the selecting the first controller and the second controller comprises receiving a user selection of the first controller, the second controller, or both the first controller and the second controller.

* * * * *